(12) United States Patent
Blaiotta et al.

(10) Patent No.: US 8,812,596 B2
(45) Date of Patent: Aug. 19, 2014

(54) SYSTEM FOR REMOTE MANAGEMENT OF MACHINE VIA INTERNET PROTOCOL LINKS

(75) Inventors: Donatella Blaiotta, Pavia (IT); Emanuel Monticelli, Legnano (IT); Simone Pensa, Buccinasco (IT); Mirco Porcari, Cortemaggiore (IT)

(73) Assignee: Siemens Aktiengesellschaft, Munich (DE)

( * ) Notice: Subject to any disclaimer, the term of this patent is extended or adjusted under 35 U.S.C. 154(b) by 1505 days.

(21) Appl. No.: 11/920,977

(22) PCT Filed: May 22, 2006

(86) PCT No.: PCT/EP2006/004817
§ 371 (c)(1), (2), (4) Date: Sep. 10, 2009

(87) PCT Pub. No.: WO2006/125579
PCT Pub. Date: Nov. 30, 2006

(65) Prior Publication Data
US 2010/0011063 A1 Jan. 14, 2010

(30) Foreign Application Priority Data
May 23, 2005 (EP) .................................... 05425356

(51) Int. Cl.
| | | |
|---|---|---|
| G06F 15/16 | (2006.01) | |
| H04M 11/04 | (2006.01) | |
| H04L 12/58 | (2006.01) | |
| H04L 29/08 | (2006.01) | |
| H04W 4/00 | (2009.01) | |
| H04W 12/08 | (2009.01) | |
| H04L 29/06 | (2006.01) | |
| H04L 12/24 | (2006.01) | |
| H04W 12/06 | (2009.01) | |
| H04W 4/12 | (2009.01) | |
| H04W 80/12 | (2009.01) | |

(52) U.S. Cl.
CPC ............ *H04L 12/581* (2013.01); *H04W 12/08* (2013.01); *H04M 11/04* (2013.01); *H04L 51/04* (2013.01); *H04L 65/1016* (2013.01); *H04L 63/10* (2013.01); *H04L 67/24* (2013.01); *H04W 4/00* (2013.01); *H04L 65/608* (2013.01); *H04L 41/0681* (2013.01); *H04W 12/06* (2013.01); *H04W 4/12* (2013.01); *H04L 67/125* (2013.01); *H04W 80/12* (2013.01); *H04W 4/005* (2013.01); *H04L 65/1006* (2013.01)
USPC .......................... 709/206; 709/224; 709/231

(58) Field of Classification Search
CPC ... H04L 67/24; H04L 65/4061; H04L 12/581; H04L 51/04
USPC ......................................... 709/206, 224, 231
See application file for complete search history.

(56) References Cited

U.S. PATENT DOCUMENTS

| 7,596,102 B2 * | 9/2009 | Forbes et al. ................. 370/260 |
| 2004/0023664 A1 | 2/2004 | Mirouze et al. |

(Continued)

OTHER PUBLICATIONS

Pääkkönen, et al.; "Interaction of All IP Mobile Internet Devices with Networked Appliances in a Residential Home"; Proceedings of the 22nd International Conference on Distributed Computing Systems Workshops, Jul. 2002; 6 pp.

Magedanz et al.; "The IMS Playground @ Fokus—An Open Testbed for next Generation Network Multimedia Services"; Proceedings of the First International Conference on Testbeds and Research Infrastructures for the Development of Networks and Communities, Feb. 2005; 10 pp.

(Continued)

*Primary Examiner* — Phuoc Nguyen (74) *Attorney, Agent, or Firm* — Staas & Halsey LLP (57) ABSTRACT

The so-called M2M solutions for the remote management of a machine or a process by users of a telecommunication network are addressed using an Internet Protocol Multimedia Subsystem platform by equipping both authorized users and a machine to be controlled with IMS clients supporting presence and messaging services as minimum requirements. The client of an authorized user sees the client of the machine as a buddy of its contact list, and interaction between the users and the machine takes place by publishing presence information by the apparatus and via instant messaging between the users and the apparatus.

17 Claims, 9 Drawing Sheets

(56) References Cited

U.S. PATENT DOCUMENTS

| | | | |
|---|---|---|---|
| 2004/0103153 A1 | 5/2004 | Chang et al. | |
| 2004/0152469 A1 | 8/2004 | Yla-Outinen et al. | |
| 2004/0193920 A1* | 9/2004 | Kiss et al. | 713/201 |
| 2005/0078642 A1* | 4/2005 | Mayer et al. | 370/338 |
| 2005/0083904 A1 | 4/2005 | Khartabil et al. | |
| 2005/0170861 A1* | 8/2005 | Niemi et al. | 455/552.1 |
| 2005/0267936 A1* | 12/2005 | Poikselka | 709/204 |
| 2005/0267984 A1* | 12/2005 | Costa-Requena et al. | 709/238 |
| 2006/0133407 A1* | 6/2006 | Kuisma | 370/447 |

OTHER PUBLICATIONS

Rosenberg, et al.; "SIP Extension for Presence"; Internet Engineering Task Force, Simple WG; Sep. 2001; pp. 1-14.

Rosenberg et al.; "Session Initiation Protocol (SIP) Extension for Presence"; Internet Engineering Task Force; May 2002; pp. 1-37.

International Search Report for Application No. PCT/EP2006/004817; mailed Oct. 2, 2006.

* cited by examiner

VIDEOREQUEST (cont.)

FIG 8B

SYSTEM FOR REMOTE MANAGEMENT OF MACHINE VIA INTERNET PROTOCOL LINKS

CROSS REFERENCE TO RELATED APPLICATIONS

This application is based on and hereby claims priority to European Application No. 05425356 filed on May 23, 2005, the contents of which are hereby incorporated by reference.

BACKGROUND

Described below is a method of and a system for the remote management of a machine via IP links.

In data communications, especially wireless communications, the so-called M2M solutions, where M2M stands for machine-to-machine, mobile-to-machine (or man-to-machine), and machine-to-mobile (man), are currently being developed. Such solutions provide developers with a simple way to use wireless data as a link between systems and remote devices or between locations and individuals. Typically, M2M solutions are created for collecting information, setting parameters, sending indications of unusual situations or taking care of an on-line transaction by a wireless data connection. New M2M applications are continuously emerging and they may serve almost any environment (telemetry, telematics, home applications, public traffic service, security and surveillance, remote medical assistance, sales and payment, service and maintenance, industrial applications and fleet management). By M2M solutions, processes can be automated, which in turn increases efficiency, saves costs and provides better service levels.

A number of commercial solutions for M2M have been already been proposed, based for instance on the short message service (SMS) or on other data transfer techniques, such as for instance the CSD (Circuit Switched Data) of GSM. In general however such solutions are based on a "vertical" platform, that is a platform implemented ad hoc for the specific application. Those solutions lack therefore flexibility, since adapting them to a new application entails substantially redesigning the platform itself. Moreover, due to the data transfer techniques adopted, they have a rather poor quality in term of immediateness and security of information communication, easiness of obtaining the information, usability, reliability, etc.

There is therefore the need of an M2M solution that is flexible, is utilisable for developing a wide range of different services, and guarantees an immediate, secure and reliable communication.

SUMMARY

This need is satisfied by the system described below which takes advantages of the integration between Internet Protocol (IP) networks and wireless networks carried out in the last years.

In particular, the system described below is based upon the use of a platform known as IP Multimedia Subsystem, in short IMS, developed by 3GPP (3rd Generation Partnership Project). This platform offers to operators, service providers and customers the service capabilities that IP is designed to provide. The primary focus of IMS is to provide the users/ customers with the ability to join multimedia sessions in which they are allowed to send and receive voice and data communications even while roaming. This feature is important for a remote device management, in that people entrusted with device controlling and monitoring can freely move and is not constrained to a fixed position. In any case, IMS is accessible also through wired networks, and this adds to the flexibility of the adopted solution.

IMS platform is described in a number of 3GPP Technical Specifications (TS), in particular 3GPP TS 22.228 V 6.5.0, "Service requirements for the Internet Protocol (IP) multimedia core network subsystem"; Stage 1, Release 6", (January 2004) and 3GPP TS 23.228 V 6.5.0, "IP Multimedia Subsystem (IMS), Release 6", (March 2004).

More particularly, according to the system described below, there is provided an M2M system in which the user equipment of each authorized end user and an apparatus to be managed are equipped with a respective client of an IMS application, which clients support messaging and presence services and are mutually subscribers for their presence information, whereby interaction between the users and the apparatus takes place via presence information publishing by the apparatus and via messaging between the users and the apparatus.

The system described below also provides a method of management of an apparatus by users of a telecommunication network via an IMS application, by installing IMS application clients support messaging and presence services in both the authorized user terminals and the apparatus. The clients are mutually subscribers for their presence information, and the apparatus to be managed is seen as a buddy in the contact list of the authorized users, so that interaction between the users and the apparatus takes place via presence information publishing by the apparatus and via messaging between the users and the apparatus.

In a described application, the apparatus is a wireless camera intended to delivery live video flows to the users and to inform them of any movement occurring in a surveyed area.

BRIEF DESCRIPTION OF THE DRAWINGS

These and other aspects and advantages will become more apparent and more readily appreciated from the following description of the exemplary embodiments, taken in conjunction with the accompanying drawings of which:

FIGS. 4 to 8 (8A, 8B) are message sequence diagrams relevant to a number of operation phases of the exemplary system.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Figure 1:
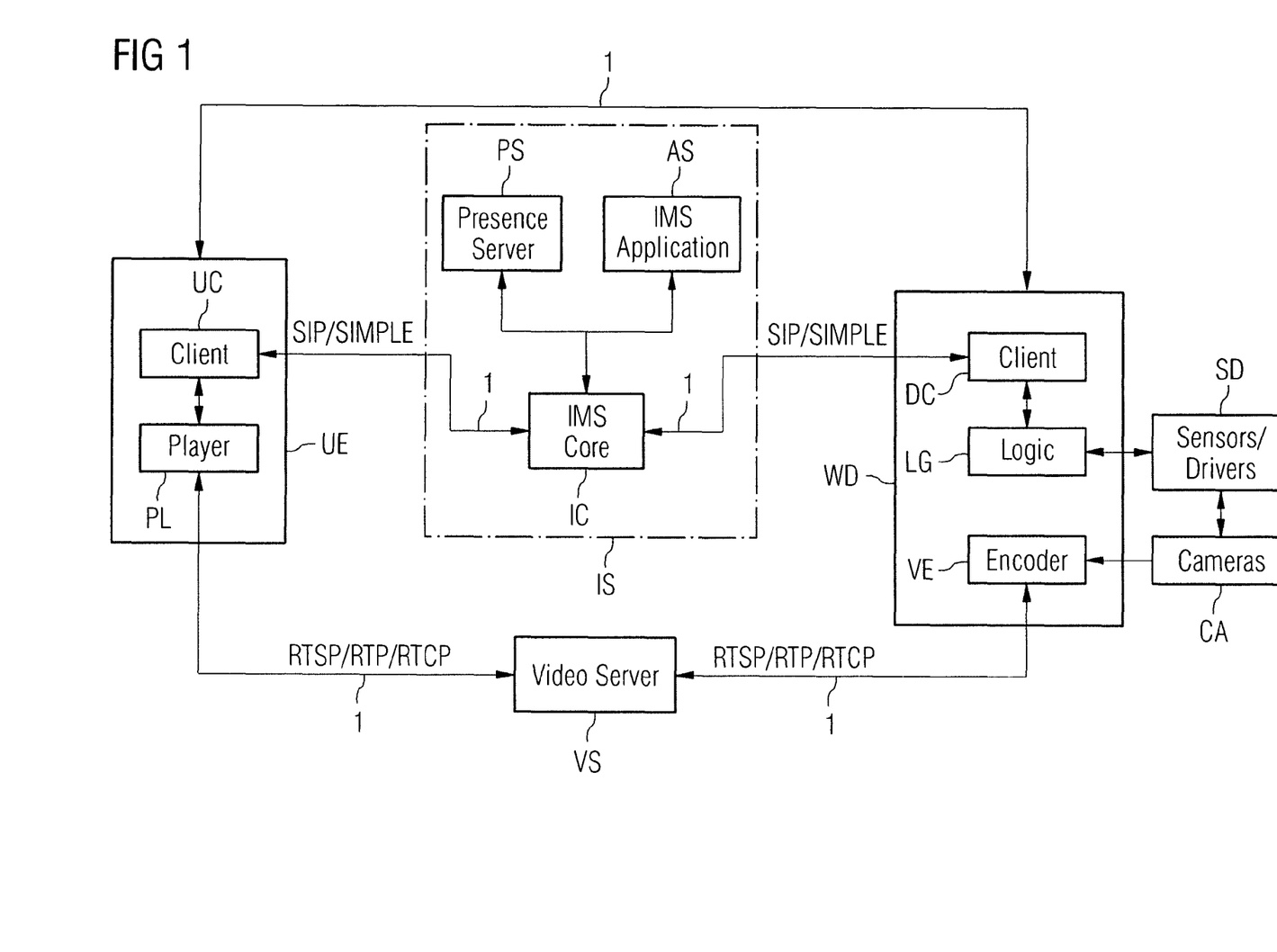
FIG. 1 is a block diagram of an exemplary system, as described below.

Referring to FIG. 1, there is shown the architecture of a system in an exemplary application to control one ore more cameras equipped with motion detection.

The architecture is based on:
  a plurality of users with a respective user equipment UE (only one user being shown in the drawing);
  one or more devices WD to be controlled (only one being shown in the drawing); the IP multimedia subsystem IS;
  a video server VS.

The different components of the system are connected through a wired or wireless network generally denoted by reference numeral 1.

User equipment UE features an IMS client UC, supporting messaging and presence as minimum requirement set, and a multimedia player PL. Examples of possible UE are UMTS (Universal Mobile Telecommunications System), GPRS/EDGE (General Packet Radio Service/Enhanced Data rate for GSM and IS-136 Evolution) mobile terminals, as well as fixed terminals, such as a personal computer or an IP phone, satisfying the above mentioned requirements. One of the users also acts as a system administrator.

Device WD (or M2M module) is a wireless or wired device, as the case may be, associated with one or more video sources (cameras) CA providing multimedia flows to be delivered to the users. Device WD is equipped with:

- an IMS client DC, also supporting messaging and presence as minimum requirement set;
- an audio and video encoder VE, capable of encoding raw multimedia flows provided by the connected source(s) CA; and
- an intelligent logic LG, capable of requesting and receiving information from a set of controlled sensors (e.g. for motion detection, excess temperature . . . ) and to send commands, parameters . . . to a set of controlled drivers, if any. The sensors and drivers are shown together by block SD. Even if all sensors and drivers have been incorporated into a block SD separate from source(s) CA, it is clear that at least part of them could be integrated in video source(s) CA, depending on the function they have to perform. An example could be the sensors for motion detection.

Of course, clients UC, DC to be installed in UE and WD, respectively, must take into account that UC is to interact with human beings whereas DC must operate autonomously, without human intervention. To better understand the differences, reference is made to FIGS. 2A and 2B.

Figure 2A:
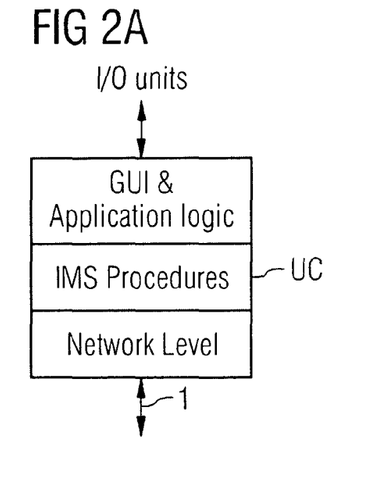
FIGS. 2A and 2B are schematic representations of the clients installed within a user equipment and a device to be managed.
Figure 2B:
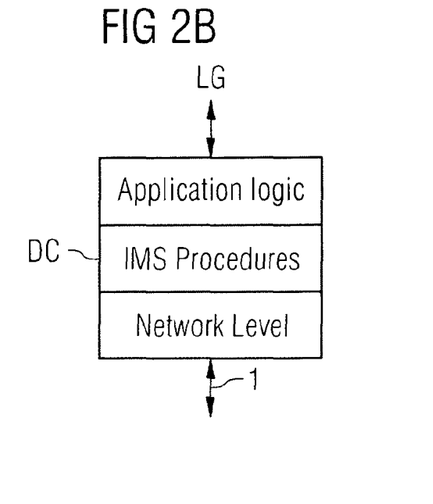

Clients UC, DC can be divided into a lower part, managing the protocols and the messages and the interactions with the network (IMS procedures, Network level in the Figures), and an upper part, providing the operating logic.

The lower parts of both clients UC, DC are identical: they interact with the network (here the IMS core platform IC) in the language typical of IMS (e.g. through register, publish, notify . . . messages) and both of them are capable of managing a messaging customised for the specific application, as will be better seen below. Moreover, in the specific application, the clients make available also other communication methods, in particular SMS, for their hosting units, as it will become apparent hereinbelow.

The differences reside in the upper parts. The logic of a client UC for a user terminal is associated with a Graphical User Interface (GUI) through which interaction with the user takes place, as indicated by the arrow leading to and coming from I/O units (i.e., the keyboard and the screen/display). Through such a GUI, the user is informed of the occurring situation and can impart commands. The logic is therefore slaved to the user's will and, from the practical standpoint, it is designed taking primarily into account usability of the GUI.

Client DC intended for a machine is on the contrary substantially autonomous. Its logic is implemented so that certain inputs trigger a set of actions and generate certain outputs. Of course, the logic is triggered not only by incoming IMS messages, but also by other events that depend on the specific context where the machine is used. Similarly, the actions the machine has to perform will be not only outgoing IMS messages towards application server AS or other users UE, but also actions intended to modify the machine state or operation. The logic is therefore to interact also with LG. Of course, in a client for a machine, the design will take primarily into account the robustness and reliability of the client itself: since the client usually is out of the reach of human intervention, the logic must foresee all cases and suitably act/react, so as to be substantially a self-healing logic.

Turning back to FIG. 1, IP Multimedia Subsystem IS should support presence and IMS applications. The structure of the IS is represented by presence server PS supporting the presence service, IMS application server AS, and IMS core IC. All those components and their tasks are well known to the skilled in the art and they need not to be described in more detail. In particular, AS is capable of managing and proxying requests from UE to WD and vice versa. Moreover, it acts as watcher of UE and WD presence information. It is assumed that UE has subscribed to WD presence information and vice versa. As indicated in the figure, communication between IS and clients UC, DC exploits SIP (Session Initiation Protocol)/SIMPLE (SIP for Instant Messaging and Presence Leveraging Extensions) for the establishment of sessions and the service provisioning. As known, SIP is an application-layer control (signalling) protocol for creating, modifying and terminating sessions with one or more participants. SIP/SIMPLE protocol is the subject matter of several IETF (Internet Engineering Task Force) documents of the RFC (Request for Comments) and Internet Draft type, well known to the skilled in the art. The concerned documents are readily available at IETF site www.ietf.org.

Video Server VS is capable of receiving encoded audio and video flows from WD and delivering them, upon a specific request, to UE for playing by MP. Advantageously, such server is a streaming server exploiting packet video technology, in which case communication of video server VS with UE and WD takes place according to protocols known as real time spreading protocols (RTSP), real time transport protocol (RTP) and real time transport control protocol (RTCP). RTP and RTCP protocols are defined in IETF RFC 1889 and 1990, and RTSP is the subject matter of Internet draft draft-ietf-rnmusic-rtsp-07.

Thanks to the presence of IMS client DC in WD, the system administrator can include WD in the contact lists of authorized end users UE, and WD behaves as any other buddy in the lists, notwithstanding it is a machine and not a person operating on the terminal. Presence information reports the functional state of WD, and any authorized end user UE can select WD as a normal contact and select the most appropriate communication method for the IMS client to interact with WD. The presence information generated by WD in part will be equivalent to the information generated by a conventional (human) buddy (e.g. offline, online . . . ), and in part will be typical of the application. WD will have an own icon on the display/screen of UE, like any human buddy, and that icon will show the presence information (for instance, by using different colours for different presence states). The icon can moreover be expanded to provide users UE with information about the devices (video sources CA, sensors and drivers SD . . . ) connected to WD.

Hereinafter, a system will be described in more detail with reference to an exemplary application in which the controlled cameras CA serve for live video delivery to pre-selected users. In this exemplary application:

- the service provides for transferring the live video contents from a mobile device (the whole of WD, CA and SD), referred to hereinafter also as WiCam (for Wireless Camera) towards one or more mobile terminals by using the UMTS network;

the WiCam device is interfaced with the mobile network through a PCMCIA card Novatel Wireless model Merlin U530 and is connected with a camera CA incorporating motion detection sensors;

the reference user equipment UE is a Nokia 6630 mobile terminal;

the IMS subsystem IS is Siemens IMS platform 3.0, and the service exploits the functionalities offered by the platform, including:

authentication, authorization and accounting;
buddy list management;
presence information, and
instant messaging.

the service communication protocol is based on customized SIP messages and SMS, the later being used while device WD is not connected to IS;

the service provides for sending an SIP instant message to the pre-selected users whenever the or a video source CA detects a movement.

Device WD in such embodiment has three operation states (FIG. 3), corresponding to as many presence states: offline state 10, online state 20 and active state 30.

WD is in offline state 10 when its PDP (packet data protocol) context is not active. Under such conditions, WD cannot be reached via IS, but only via non-IP communications through cellular network 1, e.g. via SMS (provided of course that both UE and WD are in a coverage area of the network). In that state, mobile terminal UE has no knowledge about the devices (video sources CA, sensors/drivers SD, . . . ) connected to WD. Therefore the visualisation provided by UC is limited to the WiCam icon in the colour associated with Offline state (assuming that the presence information is given through a colour). In Offline state, the only possible action is the activation (Activate, arrow 11 in FIG. 3) via SMS by authorized users, which action brings WD to Online state 20.

Figure 3:
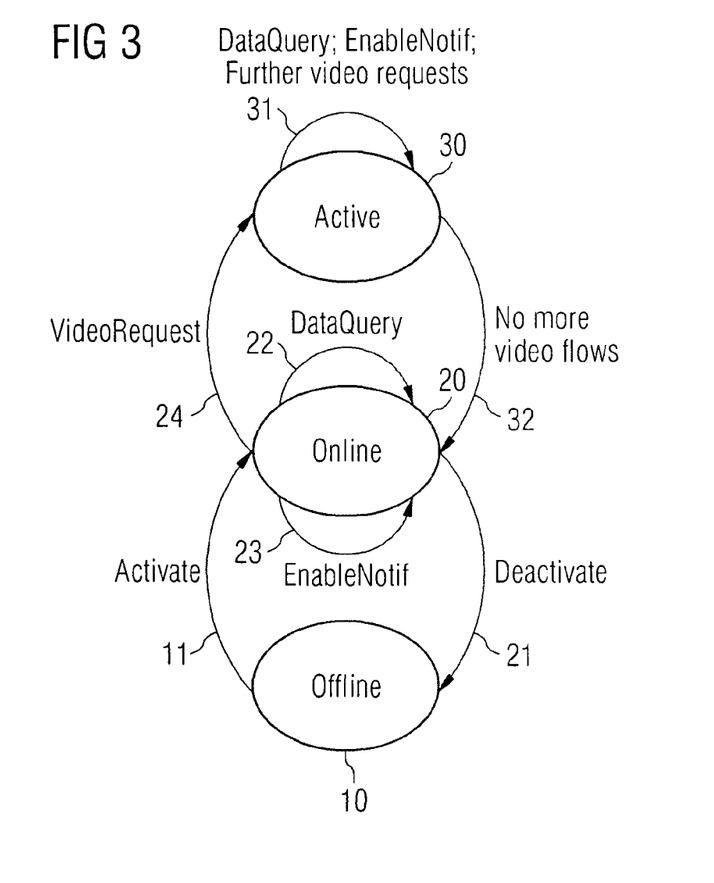
FIG. 3 is a state diagram of the operation of the device being managed in the exemplary system of FIG. 1.

In online state 20, WD has got an IP address and has registered with IS, whereby it can be reached by SIP messages. In this state, UE knows which devices are connected to WD and the WD icon can be expanded to display the search tree. In online state 20, possible actions are: deactivation (Deactivate 21), which brings WD again to offline state; the request for data (DataQuery 22) collected by sensors in SD, and the enabling of WD to notify events to the users (EnableNotif 23). All such actions leave WD in the same online state 20. A further action is the request for transmission of the video flow(s) (VideoRequest 24) from one ore more cameras CA, which brings WD to Active state 30. In online state of WD, video source(s) CA are in a condition in which they monitor movements in the surveyed area. When the or a source detects a movement, WD will communicate this, by a proper SIP message, to users enabled to receive such notifications (EventNotif).

In active state 30, WD is transmitting the video flow picked up by camera(s) CA. The following description assumes, by way of non-limiting example, that only one camera at a time, if more cameras CA are connected with WD, can transmit its video flow. In active state, the actions can be DataQuery and EnableNotif, as well as further VideoRequest messages concerning the transmitting camera. All such requests are denoted in the whole by 31 and, as shown, leave WD in the same active state 30. When no user UE is any longer requesting video flows from the camera, WD returns to online state 20 (transition 32). This is recognised by WD by monitoring the UDP (User Datagram Protocol) gates for the video flow towards video server VS.

Some further details about the messages incoming to and outgoing from device WD will follow. The messages are essentially of two kinds: SMS messages and messages conforming to SIP protocol, the latter messages being in part customised for the specific application.

SMS are used when WD is not yet or no longer connected to IS. The only SMS message incoming to WD serves for the activation. SMS messages outgoing from WD are always directed to the administrator, to inform it of a certain situation (in particular, lack of authorisation of the user requesting activation, impossibility or loss of the IP connection, passage to offline, failure in deregistration). Any outgoing SMS contains the identity of the transmitting device WD (more than one device could be controlled by the administrator) and an identifier of the situation.

SIP messages incoming to WD have a body containing both the coding of a command (Deactivate, VideoRequest, DataQuery, EnableNotif) and options for the command. The relevant structure is as follows:

Deactivate: COMMAND=DEACTIVATE|
VideoRequest:
   COMMAND=VIDEOREQUEST|OPTIONS=Video Source#
DataQuery:
   COMMAND=DATAQUERY|OPTIONS=Sensor#;
EnableNotif:
   COMMAND=ENABLENOTIF|OPTIONS=ON
   COMMAND=ENABLENOTIF|OPTIONS=OFF SIP messages outgoing from WD are of different kinds. A first group of messages includes the REGISTER messages and the PUBLISH messages.

The REGISTER messages serve for registration of WD with IS, extension of the registration validity upon expiration of an internal timeout and deregistration (with extension time equal to zero). The register messages are sent to the CSCF (Call State Control Function) within IMS core IC.

The PUBLISH messages serve for communicating the presence states, i.e. Offline, Online, Active. Those messages are sent, through IC, to presence server PS that provides for delivering them to the users. Such messages have a "notes" field that, in case of Online state, contains the list of the video sources to which WD has access, in the format:

SOURCE1|SOURCE2| . . . |SOURCEn;

the same name will appear in the search tree of the WD icon on the UE display. In case of the Active state, the "notes" field of the message contains the identity of the transmitting source (e.g. SOURCEx).

Other messages are used to reply to a DataQuery or to notify events (to IS). The messages have a body including the command and the options, as well as one or more values. For instance, a response to a DataQuery could be in the form:

$$\begin{cases} \text{from: } \textit{WiCamID} \\ \text{body:COMMAND} = \textit{DATAQUERY}|\text{OPTIONS}=<\text{Sensor\#}>| \\ \{\text{VALUE}=<\text{value}>|\textit{timestamp}\} \end{cases}$$

and an event notification could be in the form:

$$\begin{cases} \text{from:} \textit{WiCamID} \\ \text{body:COMMAND} = \textit{EVENTNOTIF}|\text{OPTIONS}=<\text{Sensor\#}>| \\ \{\text{VALUE}=<\text{value}>|\textit{timestamp}\} \end{cases}$$

The { } in the value field indicate that such field can contain a plurality of value/timestamp pairs.

A further group of messages include messages directed to the administrator, to inform the administrator of situations such as the passage to online state and of the events being notified. Messages in that last group are identified as "IM messages" in the appended message sequence diagrams discussed hereinbelow.

The Activate, DataQuery, VideoRequest, EventNotif and Deactivate procedures will now be described in more detail with reference to the diagrams in FIGS. 4 to 8. There, the messages are represented by arrows connecting the vertical lines associated each with a system component. The reference symbol of the component is indicated on top the Figures. More particularly, thin line arrows denote SIP messages, thick line arrows denote IM messages and dotted-line arrows denote SMS messages. A corner-bent arrow starting and ending at a same vertical line indicates a check performed at the component. Dashed line arrows and dot-and-dash-line arrows indicate external and internal events, respectively, concerning WD. A horizontal stroke crossing the WD line indicates an action locally performed in WD. For each procedure, the successful execution (the set of operations denoted by A) is represented first and is followed by all possible cases of failure (denoted B to F): B, D, E failures refer to the case in which a component (WiCam WD, user equipment UE or IMS server AS, respectively) is not reachable; C failures refer to a procedure started by a non-authorized user, and F failures are due to a general (system) error.

Figure 4:
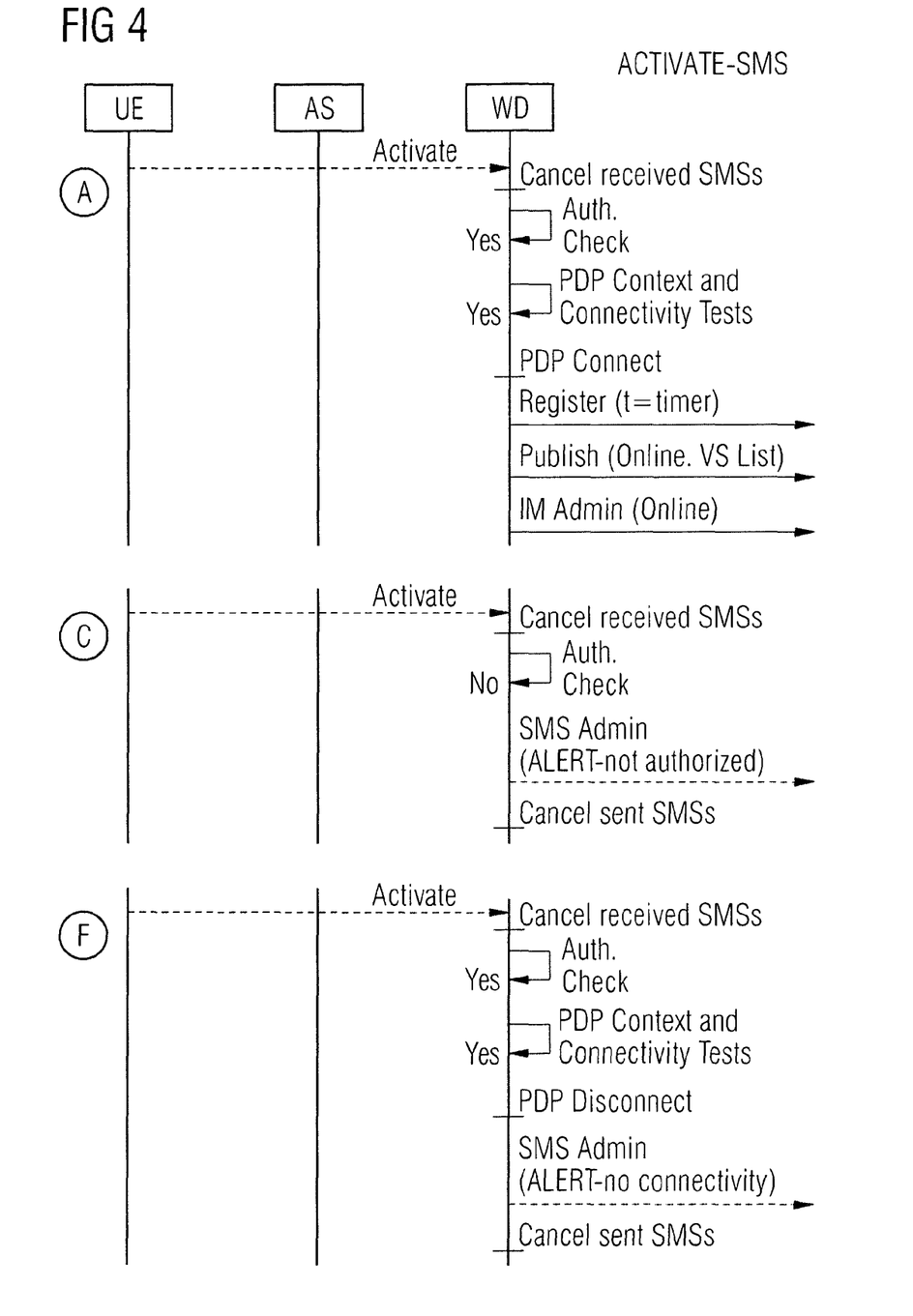

FIG. 4 illustrates the activate procedure 11. User UE sends WD an SMS message only containing the "Activate" command. Upon receiving the message and recognising the type, WD checks whether the user is authorized to the action (Auth. Check). In the affirmative, WD performs the tests on PDP Context and connectivity and then connects itself to the Internet (PDP Connect). Afterwards, WD registers with AS for the desired time, sends the SIP Publish message with the indication of the "online" state to presence server PS and communicates that state also to the administrator.

The possible failures of the activate procedure are due to the negative results of the authorisation check or of the PDP Context and connectivity tests. In the first case (C), WD sends an SMS with the corresponding alert signalling the administrator. In the second case (F), WD disconnects from PDP and then sends the SMS with the corresponding alert signalling to the administrator.

Note that, in order to avoid overflow problems on the SIM of UE or on the WD card, the list of the messages sent/received is emptied after the parsing of each message and the interpretation of the actions to be performed.

FIGS. 5 to 8 concern procedures performed in online state 20 or active state 30 (FIG. 3), where WD is connected to the Internet and therefore it can receive/send SIP messages. As in any SIP-based application, each message transmitted is replied to by an acknowledgement (200 OK) or non-acknowledgement (4*xx*/5*xx*) message, as the case may be.

Figure 5:
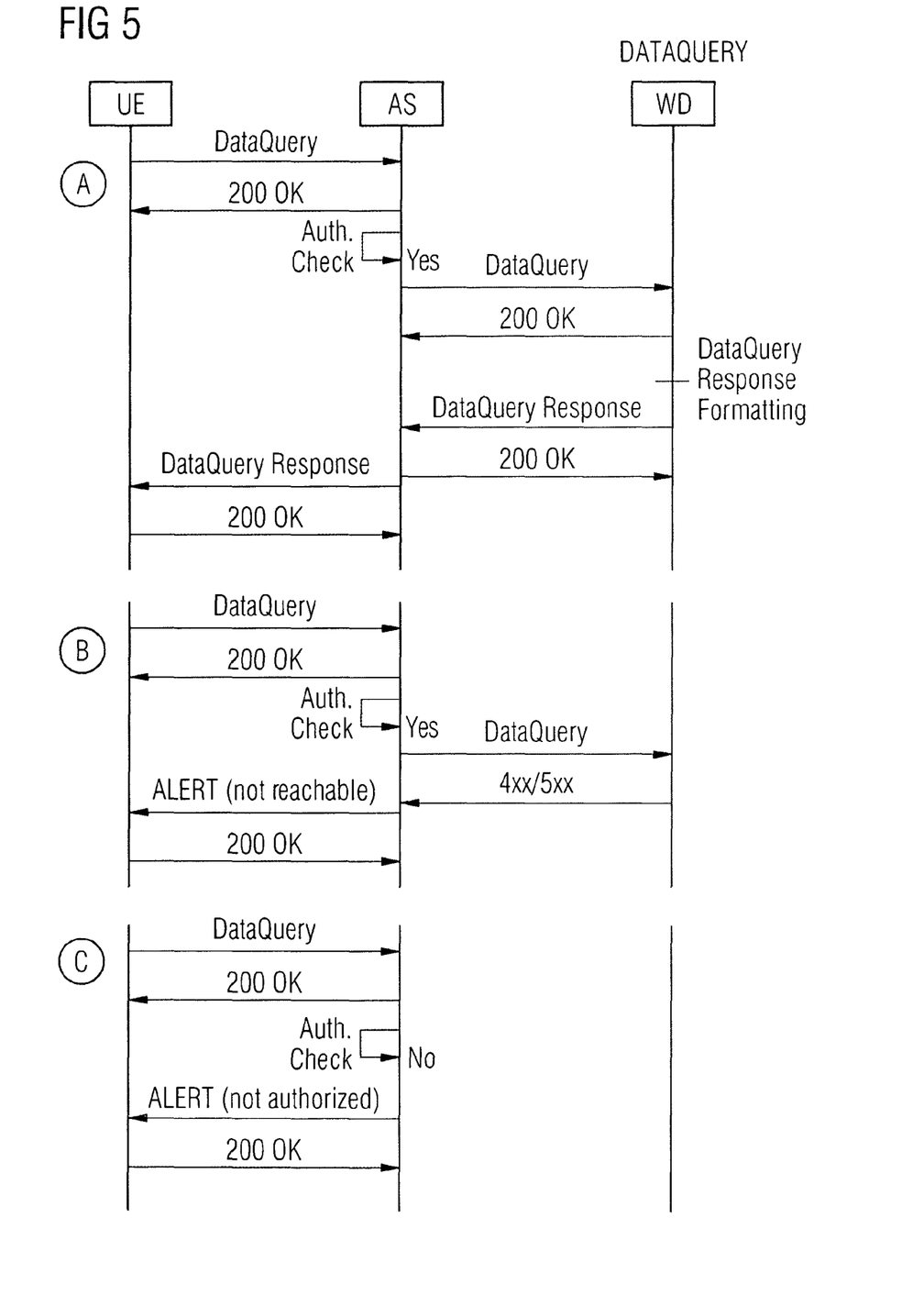

FIG. 5 shows the DataQuery procedure. The procedure is the same independently of whether the starting state is the online state 20 and/or the active state 30. User UE sends the relevant SIP message to AS, which, upon receiving it, performs the authorisation check and, if the check is successful, forwards the message to WD. WD in turn prepares a suitable formatted response and sends it to AS that forwards the response to UE. The possible failures of the procedure are failures B and C. In case of failure B a non-acknowledgement (4*xx*/5*xx*) message is generated in response to transmission of DataQuery from AS to WD. This gives rise to an SIP alert message towards UE, specifying that WD is not reachable. In case of Failure C, the DataQuery message is not forwarded by AS to WD, and UE receives from AS an SIP alert message specifying that UE is not authorized to the operation.

Figure 6A:
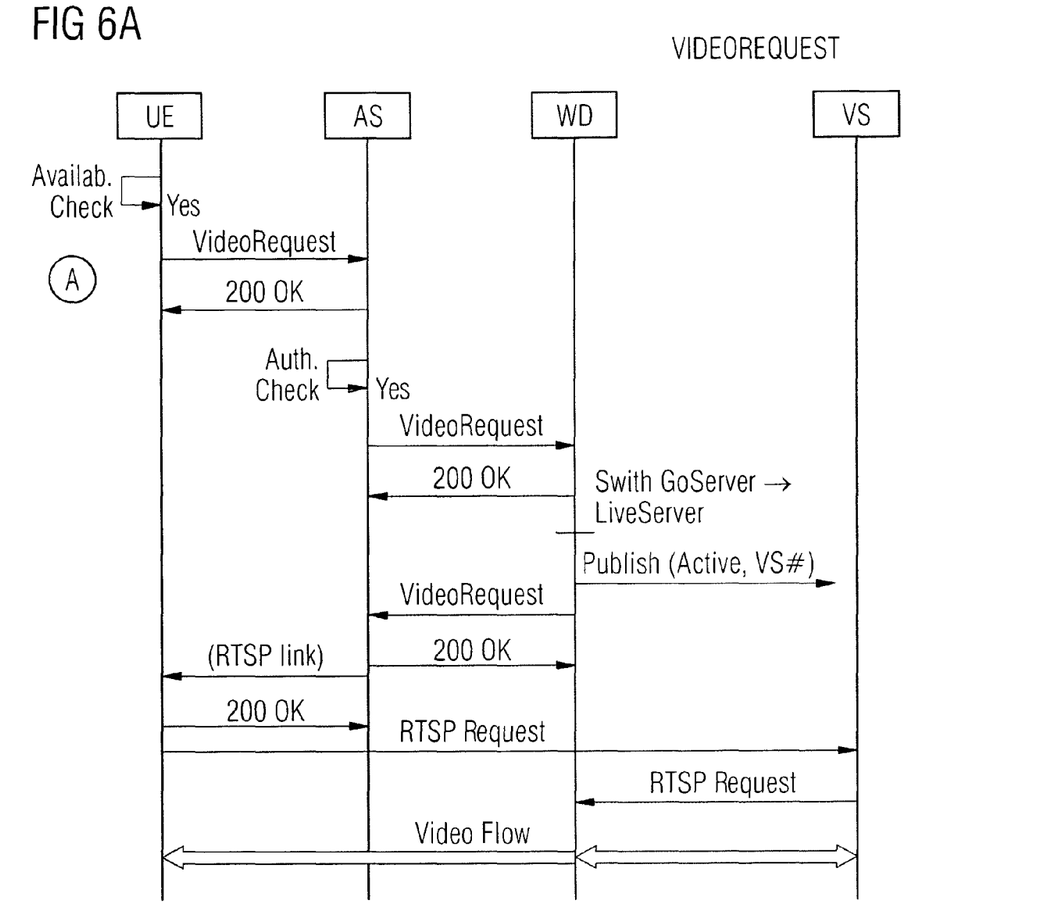
Figure 6B:
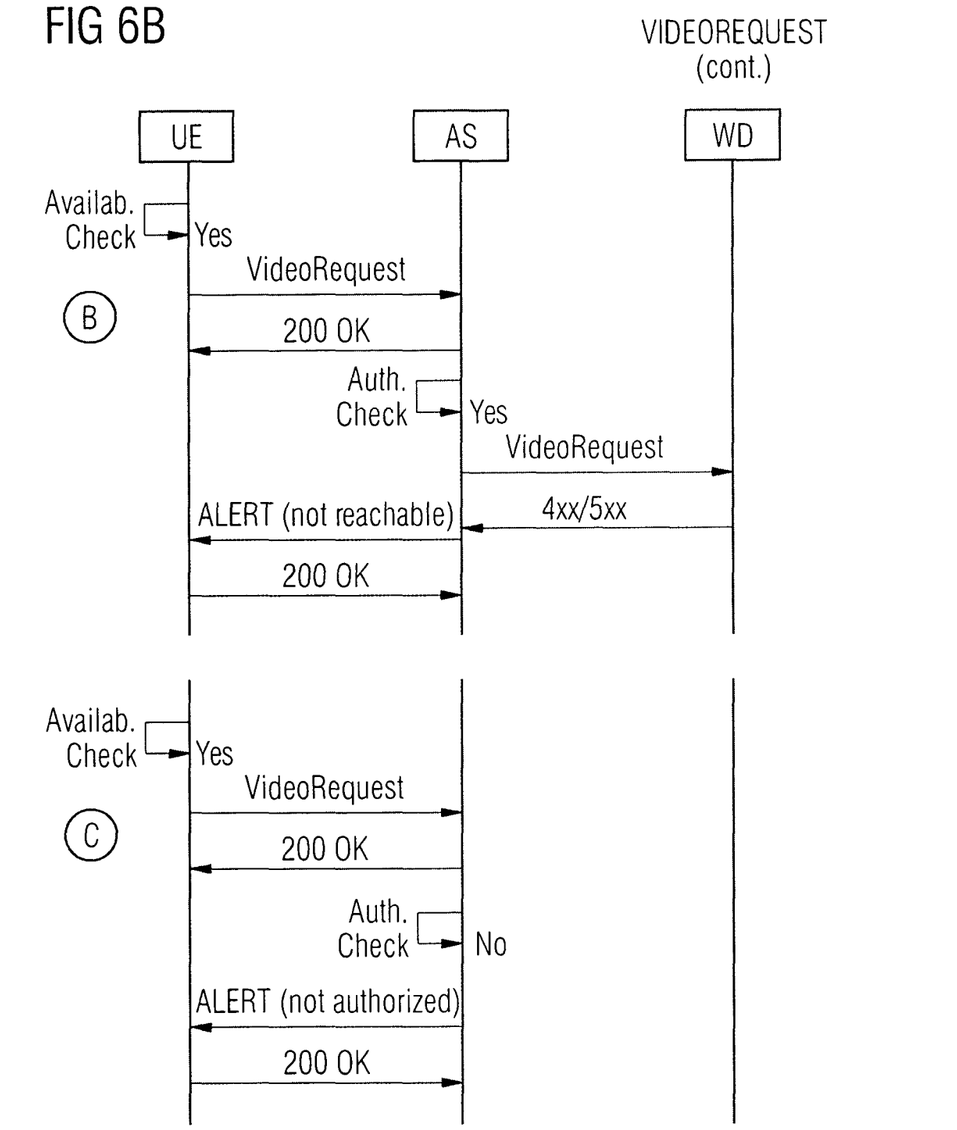

FIGS. 6A and 6B show the VideoRequest procedure in online state 20. The procedure can be performed only upon a positive result of a camera availability check performed by UE. In practice, if the camera is not available, the corresponding icon on the user terminal cannot be acted upon. If the camera is available, the VideoRequest message is transmitted to WD as in the case of the DataQuery. As a consequence of the VideoRequest, WD passes to active state 30, generates an SIP publish message containing the corresponding indication together with the identity of the camera concerned by the request, and predisposes itself to become connected with video server VS (switch GoServer→LiveServer). Concurrently, with such operations, the RTP/RTCP/RTSP link is set up between UE, VS and WD (Messages RTSP link, RTSP request). When the link has been set up, the video flow can be forwarded to UE through video server VS. Failures are as in the DataQuery case.

The VideoRequest procedure performed in active state 30 of WD is quite similar to the described one: the differences are that no publish message is necessary, since WD is already in active state, nor are necessary the messages for setting up the RTP/RTCP/RTSP links with video server VS, since such link is already active.

Figure 7:
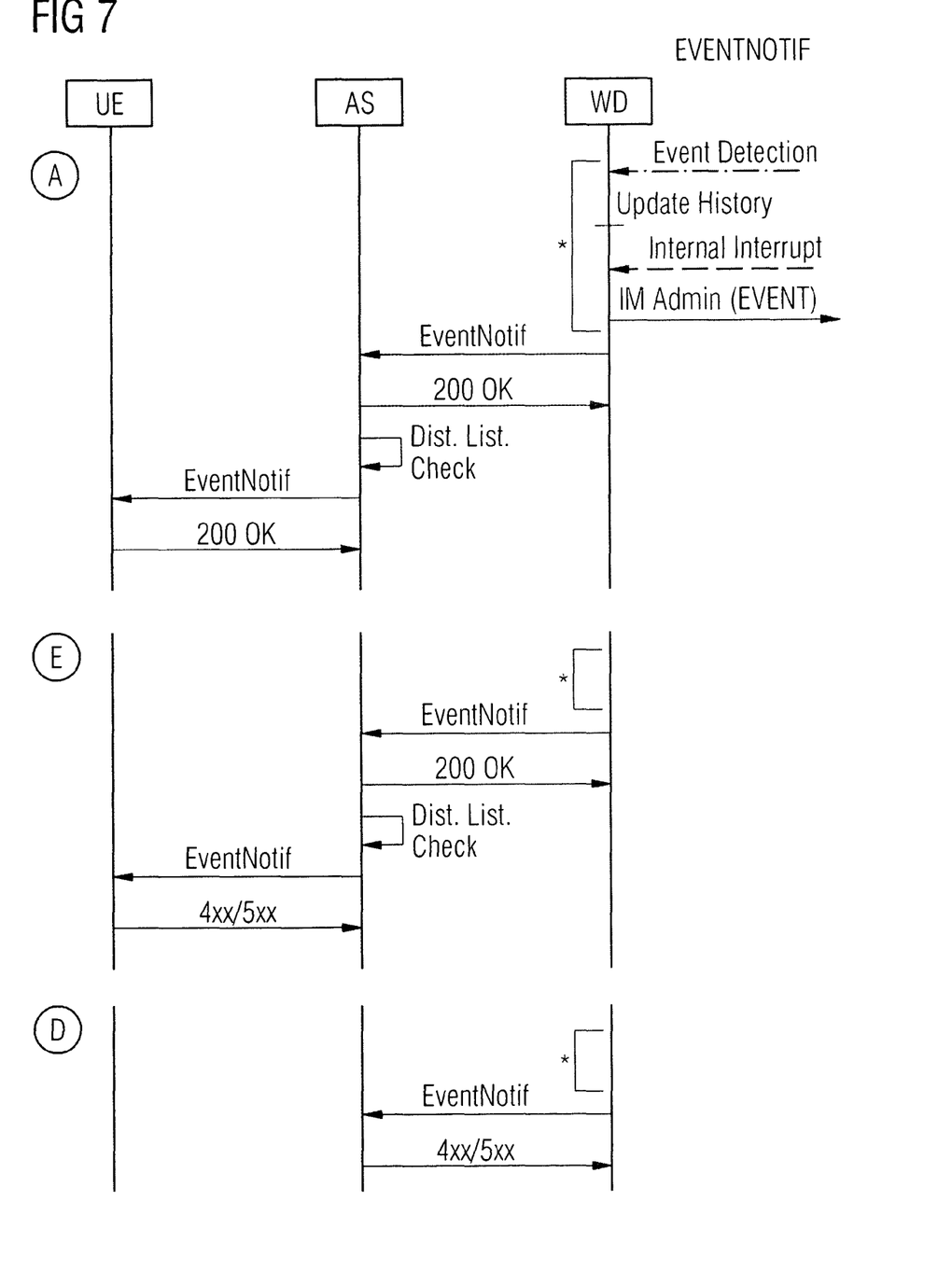

FIG. 7 shows the event notification procedure (EventNotif, i.e. the communication by WD, when enabled, that an event, for instance a movement, has been detected by the proper sensor in SD (FIG. 1). Upon detecting the event, WD sets a corresponding flag on and updates a historical record of the event. Then, after the "on" state of the flag has been recognised ("internal interrupt" in the FIGURE), the flag is reset to the "off" state, the event is communicated to the administrator via an IM message, and an SIP EventNotif message is sent to AS. AS checks the distribution list and forwards the message to the UEs in the list. Possible failures can be of E and D type, which are handled as discussed above for B failures.

Figure 8A:
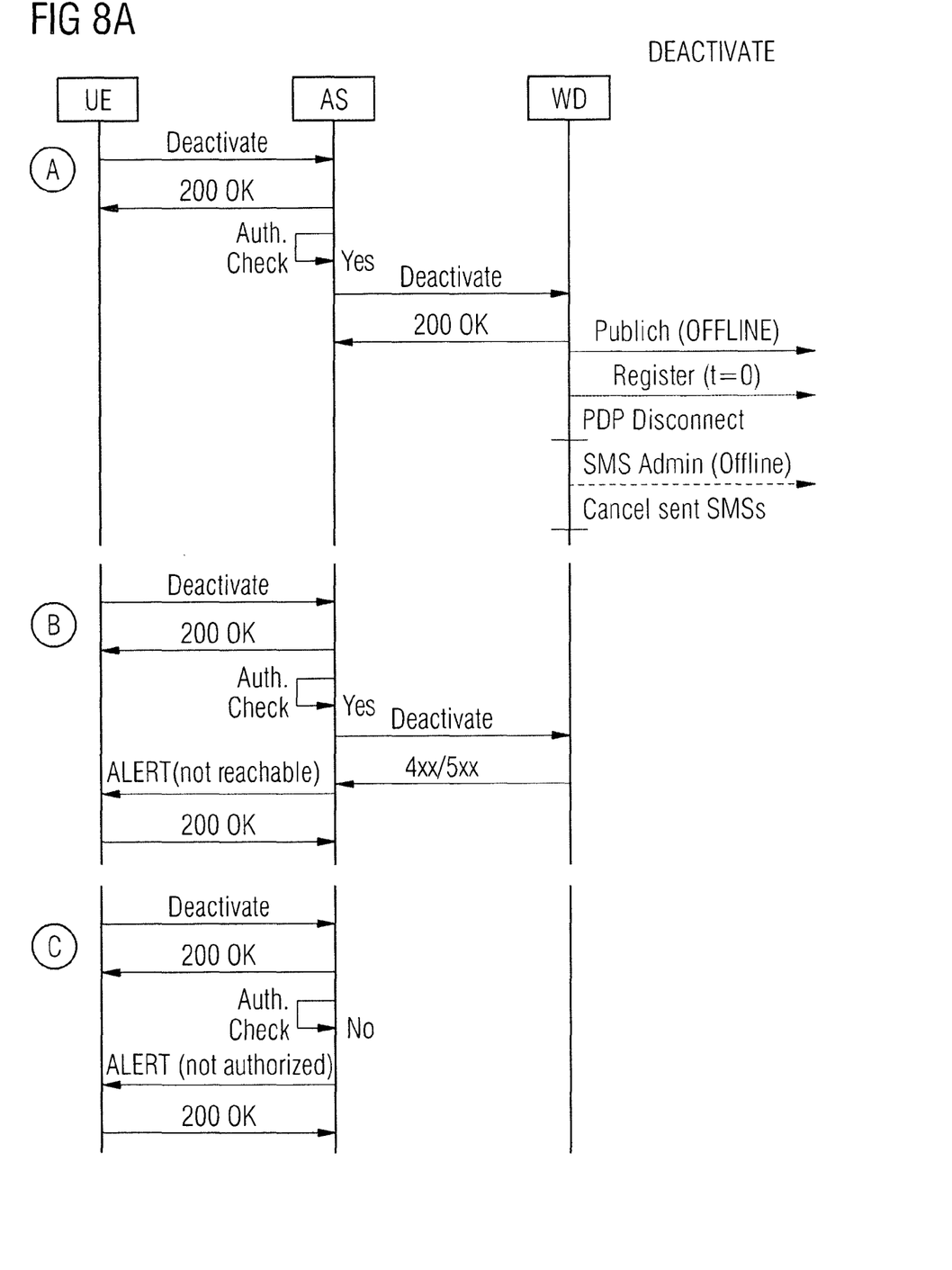
Figure 8B:
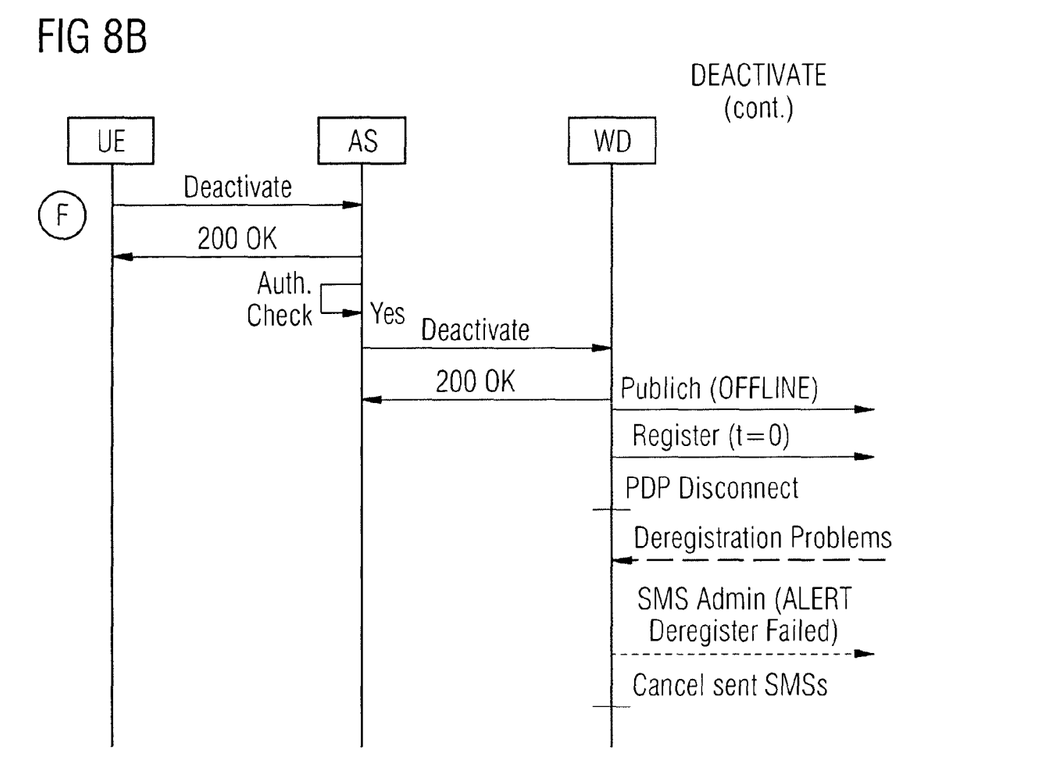

FIGS. 8A, 8B show the deactivation of WD. The SIP message requesting deactivation is sent to AS as in the DataQuery and VideoRequest procedures. As a result, WD generates a publish message indicating the offline state and a register message indicating the expiry of the registration time. Then WD disconnects from PDP and communicates the offline condition also to the administrator. Since WD is disconnected from IS, the latter communication is made via an SMS.

The possible failures of the deactivation procedure are failures B, C, which are handled as in the other procedures, and F The latter failure can be due to deregistration problems and is signalled to the administrator by a proper SMS message.

It is evident that the above description has been given by way of non-limiting example. Thus, even if reference has been made to the application to a video delivery service through the management of a wireless camera, a system like that described above can be used for the management of any external device. The skilled in the art has no problem in adapting the logic in the clients and in designing the IMS procedures for the specific case. Moreover, even if a management exploiting both the clients and a server has been disclosed, the interaction between users and device could take place directly between the clients, without need of a server.

The system also includes permanent or removable storage, such as magnetic and optical discs, RAM, ROM, etc. on which the process and data structures of can be stored and distributed. The processes can also be distributed via, for example, downloading over a network such as the Internet.

The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A system of remote management of at least one apparatus, configured with Internet protocol communication, by authorized end users via a telecommunication network supporting Internet protocol connections, comprising:
   at least one computer implementing an operation relative to the system including:
      supporting a messaging service of the authorized end users and the at least one apparatus using a plurality of messaging components of the authorized end users, respectively, for interaction between the authorized end users and the at least one apparatus, and
      providing a client of an Internet Protocol Multimedia Subsystem application supporting a presence service other than the messaging service of the plurality of messaging components, where the interaction uses presence information publishing and messaging between the authorized end users and the at least one apparatus customized to recognize an event depending on context corresponding with the plurality of messaging components.

2. The system as claimed in claim 1, comprising:
   an Internet Protocol Multimedia Subsystem application server supporting presence and Internet Protocol Multimedia Subsystem applications and acting as a watcher for the presence information originated from the client of the Internet Protocol Multimedia Subsystem application in each of said messaging components, and
   wherein the client of the Internet Protocol Multimedia Subsystem application in each of said messaging components is connected via the Internet protocol connections to said Internet Protocol Multimedia Subsystem application server.

3. The system as claimed in claim 2,
   wherein one of the authorized end users is a system administrator, and
   wherein the at least one apparatus is included as a buddy in contact lists of the authorized end users.

4. The system as claimed in claim 3, wherein a non-Internet protocol communication is supported by the client of the Internet Protocol Multimedia Subsystem application in each of said messaging components.

5. The system as claimed in claim 4, further comprising a streaming server operating in packet video technology,
   wherein the at least one apparatus includes at least one multimedia flow source, supplying at least one multimedia flow and an encoder transmitting the at least one multimedia flow to the authorized end users via said streaming server, and
   wherein the user equipment includes a multimedia player for outputting the at least one multimedia flow.

6. The system as claimed in claim 5,
   wherein the at least one apparatus detects at least one of events, environmental conditions and apparatus conditions, and
   wherein the client of the at least one apparatus notifies the at least one of events, environmental conditions and apparatus conditions to the client of the user equipment upon occurrence or in response to a request by the authorized end users.

7. The system as claimed in claim 6, wherein the events include movements in an area surveyed by a camera producing at least part of the at least one multimedia flow.

8. The system as claimed in claim 7, wherein the telecommunication network is a Universal Mobile Telecommunications System network, and the non-Internet protocol communication communicates via short message service.

9. The system as claimed in claim 8, wherein the client of the at least one apparatus has presence states as follows:
   an offline state, in which the at least one apparatus has no Internet protocol-connection active and can be reached by the client of the Internet Protocol Multimedia Subsystem application in each of said messaging components of the user equipment only via the non-Internet protocol communication, when determining the authorized end users and the at least one apparatus have access to the Universal Mobile Telecommunications System network;
   an online state, in which the at least one apparatus has an Internet protocol address and has registered with said Internet Protocol Multimedia Subsystem application server so that the at least one apparatus can be reached through the messaging service, the at least one apparatus passing from the offline state to the online state upon an activation requested by a first one of the authorized end users via the non-Internet protocol communication and being capable, when in the online state, of notifying about the events and transmitting data to the authorized end users;
   an active state, which is reached from the online state upon request, by a second one of the authorized end users, for transmission of the at least one multimedia flow and which is maintained as long as the at least one multimedia flow is being transmitted to the authorized end users.

10. A method of remote managing at least one apparatus by authorized end users via a telecommunication network supporting Internet protocol connections, comprising:
    installing clients of an Internet Protocol Multimedia subsystem application in user equipments of the authorized end users and at least one apparatus, and
    configuring the clients to support a presence service other than a messaging service of respective plurality of messaging components of the authorized end users, the clients being subscribers for presence information generated by the at least one apparatus and the authorized end users, and
    where each of the clients are mutual subscribers, and
    interaction between the authorized end users and the at least one apparatus uses presence information publishing and messaging between the authorized end users and the at least one apparatus customized to recognize an event depending on context corresponding with the plurality of messaging components.

11. The method as claimed in claim 10, wherein the presence information publishing and the messaging take place via an Internet Protocol Multimedia Subsystem application server of an Internet Protocol Multimedia Subsystem supporting presence and Internet Protocol Multimedia Subsystem applications, the Internet Protocol Multimedia Subsystem application server acting as a watcher for the presence information originated from the clients.

12. The method as claimed in claim 11, further comprising connecting the clients via non-Internet protocol connections through the telecommunication network when the at least one apparatus application client is not connected with the Internet Protocol Multimedia Subsystem application server.

13. The method as claimed in claim 12, further comprising associating the at least one apparatus with at least one multimedia source for multimedia content delivery to the authorized end users in encoded packet form.

14. The method as claimed in claim 13, further comprising:
  detecting, by a unit associated with the at least one apparatus, at least one of events, environmental conditions and apparatus conditions; and
  notifying the at least one of events, environmental conditions and apparatus conditions by at least one of the clients operating on the at least one apparatus to the clients of the user equipment upon one of occurrence and request by one of the authorized end users.

15. The method according to claim 14, wherein the events include movements in an area surveyed by a camera supplying at least part of the at least one multimedia flow source.

16. The method as claimed in claim 15, further comprising connecting the user equipment, the at least one apparatus and the Internet Protocol Multimedia Subsystem application server via a Universal Mobile Telecommunications System network and using short message service for the non-Internet protocol connections.

17. The method as claimed in claim 16, further comprising operating the at least on client of the at least one apparatus to have presence states as follows:

an offline state, in which the at least one apparatus has no Internet protocol-connection active and can be reached by the clients running on the user equipment only via the non-Internet protocol connections, when determining the authorized end users and the at least one apparatus have access to the Universal Mobile Telecommunications System network;

an online state, in which the at least one apparatus has an Internet protocol address and has registered with the Internet Protocol Multimedia Subsystem application server so that the at least one apparatus can be reached through the messaging service, the at least one apparatus being brought from the offline state to the online state upon an activation requested by a first one of the authorized end users via the non-Internet protocol connections and being capable, when in the online state, of notifying about the events and transmitting data to the authorized end users;

an active state, which is reached from the online state upon request, by a second one of the authorized end users, for transmission of the at least one multimedia flow and which is maintained as long as the at least one multimedia flow are being transmitted to authorized end users.

* * * * *